United States Patent Office 2,996,469
Patented Aug. 15, 1961

2,996,469
GRAFT COPOLYMER OF VINYL CHLORIDE POLYMER COMPOSITION, LATEX THEREOF, METHOD OF MAKING, AND ARTICLE COATED THEREWITH
Albert J. Cole and Floyd L. Edris, Pottstown, Pa., assignors to The Firestone Tire & Rubber Company, Akron, Ohio, a corporation of Ohio
No Drawing. Filed May 14, 1958, Ser. No. 735,097
7 Claims. (Cl. 260—29.7)

This invention relates to coatings based on vinyl chloride polymers, and more particularlry to latex compositions from which hard, transparent, cohesive coatings of these materials can be laid down.

Vinyl chloride resins have many properties—hardness, transparency, chemical- and age-resistance, etc.—ideally adapting them for coatings on metal, wood, plastics and the like. A considerable volume of these resins are in fact employed in solvent coating compositions. However, it would be highly desirable to provide coatings of this type which can be laid down from aqueous media, so as to avoid the inconvenience and expense of solvents. It is known that latices of vinyl chloride resins may be blended with latices of butadiene-acrylonitrile elastomers, and that more-or-less plasticized and coherent films may be laid down from the blended latices. However, the amount of the elastomer latex necessary to secure a given degree of clarity and cohesiveness of the deposited film invariably produces a softening of the film which is excessive in relation to the degree of clarity and coherence attained.

Accordingly, it is an object of this invention to provide novel and improved coatings and coating compositions based on vinyl chloride resins.

Another object is to provide such coatings in the form of aqueous dispersions or latices.

A further object will be to provide such coatings which will combine clarity and cohesiveness on the one hand, together with a high degree of hardness and toughness on the other hand.

SYNOPSIS OF THE INVENTION

The above and other objects are secured, in accordance with this invention, in latices of vinyl chloride resins upon which have been graft copolymerized mixtures of butadiene or homologs thereof and acrylonitrile or homologs thereof. Hereinafter, in general discourse, for brevity it will be understood that homologs of butadiene and acrylonitrile are to be included in any statements relating to these compounds. In a latex according to this invention, the ratio of the weights of the substrate vinyl chloride resins to that of the mixture of butadiene and acrylonitrile should be from 60/40 to 80/20 inclusive, (preferably 65/35) and the ratio of the weight of butadiene to that of acrylonitrile in the mixture of grafted monomers should be from 65/35 to 85/15 inclusive (preferably 70/30). Preferably by far, the emulsifying agent employed in the original polymerization of the vinyl chloride resin latex should be an alkylated aromatic hydrocarbon sulfonate, and the grafting of the butadiene-acrylonitrile mixture shosuld be carried out without adding any supplemental peroxidic catalysts or emulsifying agents other than those used in the original polymerization of the vinyl chloride in the latex. Films laid down from the latices of this invention, when dried at moderate temperatures on the order of 4°–98° C., yield films which are hard, coherent and tough, but which are nevertheless desirably clear and transparent.

THE VINYL CHLORIDE RESIN SUBSTRATE

Generally, the vinyl chloride polymer of the substrate is a vinyl chloride homopolymer, but up to 20% of comonomers, based on the weight of the final resultant vinyl chloride copolymer, may be used in producing the vinyl chloride resin of the substrate. Monomers which are suitable for producing copolymers with vinyl chloride are well known and include, for instance, vinylidene chloride, vinyl acetate, vinyl stearate, styrene, acrylic and methacrylic esters such as methyl methacrylate, ethyl methacrylate, propyl methacrylate, butyl methacrylate, octyl methacrylate, dodecyl methacrylate, and the like, methyl acrylate, ethyl acrylate, propyl acrylate, butyl acrylate, octyl acrylate, dodecyl acrylate and the like, alkyl fumarates, alkyl maleates and the like, acrylonitrile, vinyl-type ethers and ketones such as methyl vinyl ether, methyl vinyl ketone and related compounds such as methyl isopropenyl ketone and the like. A more complete listing of suitable comonomers useful for polymerizing with vinyl chloride to produce latices used in this invention is found in Krczil "Kurzes Handbuch der Polymerisationstechnik"—II Mehrstoff-Polymerisation," Edwards Bros. Inc. 1945 pp. 735–37, the items under "Vinyl chlorid."

It is important that the vinyl chloride be polymerized in a system that will constitute a true emulsion polymerization system so as to yield a true latex. To this end, the emulsifying agent employed should be of the micelle-forming type, and the catalyst employed should be of the water-soluble peroxidic type. In general the micelle-forming emulsifying agents used are compounds containing hydrocarbon groups of from 5 to 22 carbon atoms coupled to highly polar solubilizing groups such as alkali metal and ammonium carboxylic groups, sulfate half-ester groups, sulfonate groups, phosphate partial ester groups and the like. Exemplary emulsifying agents include sodium oleate, sodium stearate, sodium caproate, the sodium salts of the sulfate half-esters of fatty alcohols produced by the reduction of the fatty acids of natural oils such as coconut oil, sodium abietate, sodium salts of sulfosuccinic esters such as sodium dioctyl sulfosuccinate, sodium salts of alkylated benzene and naphthalene sulfonic acids such as sodium dodecyl naphthalene sulfonate, sodium sulfonate of benzene alkylated with polyisopropylene, sodium salts of sulfated fatty monoglycerides, and the like. It is by far preferable to use the sulfonates of alkylated benzene or naphthalene, because these emulsifiers give latices of improved mechanical stability and also make it possible to conduct the graft copolymerization step without the addition of further emulsifiers. The polymerization medium will contain a suitable water-soluble free-radical-generating catalyst such as hydrogen peroxide, potassium or sodium persulfates, perborates, peracetates, percarbonates and the like, which catalysts may be associated with activating systems such as redox systems involving versivalent metals and mild reducing agents. Polymerization is effected by agitating the monomers, emulsifying agents and catalysts in sufficient water (say 45% or more by weight of the monomers) to effect emulsification, and adjusting the temperature to from about 40° C. to about 100° C., or, in the case of activated systems, from 0° C. to 80° C. The polymerization will usually be carried to the extent of at least about 75% before the to-be-grafted mixture is added. Any unreacted monomers are optionally, and preferably, stripped off before the to-be-grafted monomers are added for polymerization; the butadiene would, in any event, interfere with any further polymerization of the vinyl chloride.

THE GRAFTING OF THE MIXTURE OF BUTADIENE AND ACRYLONITRILE OR HOMOLOGS THEREOF

To the latex prepared as just described, there is added a mixture of butadiene (and/or one or more homologs thereof) and acrylonitrile (and/or one or more homologs thereof) in amounts such that the ratio of the weight of vinyl chloride polymer or copolymer in the latex to that of the added mixture will be from 60/40 to 80/20 inclusive, and preferably about 65/35. Homologs of butadiene include for instance isoprene, 2,3-dimethyl butadiene, piperylene and the like, and homologs of acrylonitrile, methacrylonitrile, alpha-ethyl acrylonitrile and the like. It will be understood that butadiene and its homologs may be used individually alone, or in any mixture of two or more thereof, and similarly acrylonitrile and its homologs may be used individually alone or in any mixture of two or more thereof. The total amount of the mixtures added should be such that the ratio of the weight of butadiene (and/or homologs) to the weight of acrylonitrile (and/or homologs) therein is from 65/35 to 80/20 inclusive, and preferably 70/30. It is desirable to continue the polymerization without addition of any further catalyst. In the particular system polyvinyl chloride-butadiene/acrylonitrile superstrate involved in the present invention, further addition of catalyst is unnecessary to produce polymerization of the added monomers, and introduces a tendency towards pre-coagulation of the latex and impairment of the heat- and light-aging properties, and electrical characteristics of the resin. In addition, there is evidence that the character of the polymerization is different when no catalyst is added; it is surmised that, when no catalyst is added, no fresh growing chains of polymer are created, so that further polymerization takes place by way of continued lengthwise growth of the established polymeric chains, rather than by way of lateral attachment of side chains. At any rate, the general performance of the latex and the resulting coatings is improved when the grafting operation is carried out without the addition of supplemental catalyst. Also, it is desirable that there be added a mercaptide-type chain-transfer agent to the reaction mixture during the grafting reaction in order to regulate the hardness of the final product. The grafting is effected by adjusting the temperature to the polymerization range (if it is not already in that range) i.e., 40°–100° C. in the case of unactivated, and 0°–100° C. in the case of activated systems. When the required amount of the grafted monomers has reacted, any excess monomers are blown off. The resultant latex is then ready for use in coating or other applications.

FORMATION OF COATINGS FROM THE GRAFT COPOLYMERS

The primary use of the graft copolymers of this invention is for the formation of hard, coherent, smooth and clear coatings on a variety of surfaces, such as linoleum; asphalt, vinyl and other composition floor tiles; wood; asbestos board; masonry products such as concrete, brick or plaster; composition building board; and in the impregnation of porous materials such as paper, felt etc. The coatings are applied by dipping, spraying, brushing, flow-coating, roller coating or similar processes, using the liquid latices produced as above described. The coatings are then dried in the air or other gaseous medium at temperatures on the order of 4–90° C. The resultant films are hard, tough, coherent, and impervious, and adhere well to the surfaces to which they are applied. As compared with the most nearly analogous previously known compositions, namely blends of separately-prepared latices of vinyl chloride resins and butadiene-acrylonitrile elastomers, for any given gross elemental composition of the elements of vinyl chloride, butadiene and acrylonitrile, the films produced in accordance with this invention are much smoother, clearer and more transparent. Also, it is possible, with the grafted latices of this invention, to obtain coherent films with a much lower content of butadiene and acrylonitrile, and consequently to obtain much harder films, than is possible with the simple blended latices of the prior art.

With the foregoing general discussion in mind, there are given herewith detailed examples for the practice of this invention. All parts and percentages given are by weight.

Example 1

A. Substrate Latex:

| | Parts |
|---|---|
| Vinyl chloride | 100 |
| Alkylated aryl sulfonate | 7.7 |
| Potassium persulfate | 0.3 |
| Water (distilled) | 100 |

B. Grafted material:

| | |
|---|---|
| Butadiene | In ratios of butadiene/acrylonitrile of 55/45 to 80/20; in total amounts such as to give ratios of vinyl chloride/butadiene + acrylonitrile of 65/35 to 80/20. |
| Acrylonitrile | |
| Water (distilled) | Amount equal to 0.56 the weight of butadiene plus acrylonitrile. |

A series of graft copolymer latices according to this invention was prepared, varying the ratio of grafted monomers to vinyl chloride resin substrate, and of butadiene to acrylonitrile, from one run to another as indicated in Table I. In each case a substrate latex was prepared from the ingredients listed at "A." All of the ingredients except the vinyl chloride were charged into a polymerization vessel at 25° C. The vessel was evacuated, and the free space purged with vinyl chloride vapor, after which the vinyl chloride was pressured in. Agitation (about 2.0 intensity on the Pfaudler scale) was commenced and the temperature raised to 45° C. and kept at this value for 24 hours, resulting in substantially complete polymerization of the vinyl chloride to form a latex. The ingredients listed at "B," in the proportions chosen for that run as set out in Table I, were next charged, the water being charged first, followed by the butadiene and acrylonitrile. Agitation at 65° C. was continued for a further 24 hours, at the end of which time the (slight amount) of unreacted monomers were vented and the reaction mixture cooled to 25° C. There resulted a latex of a graft copolymer of butadiene and acrylonitrile upon polyvinyl chloride according to this invention.

Microscope slides were dipped into each latex, and dried in an oven at 50° C. for 60 minutes. The resulting film was then subjectively rated for clarity, the ratings being set forth in Table I. In all cases, the clarity was superior to that of a corresponding film (in cases where such films could be formed) made from blends of latices of polyvinyl chloride and separately-prepared butadiene-acrylonitrile copolymers, having the same gross elemental composition of vinyl chloride, butadiene and acrylonitrile.

Likewise, the adhesion to metal of films deposited from the latices was rated. In each case the latex was spread upon a polished and degreased steel plate and dried for one hour in an oven at 50° C. The film was then cut through to the metal by razor cuts in the form of an "X," a length of pressure-adhesive cellophane tape was pressed down upon the cuts, and then abruptly jerked away. The extent, if any, to which the film came away with the tape was taken as an inverse measure of the excellence of adhesion. The ratings so obtained are set forth in Table I.

TABLE I

| Weight Ratios | | Transparency Rating | Adhesion to Steel | Run No. |
|---|---|---|---|---|
| Vinyl Chloride to Butadiene/Acrylonitrile | Butadiene to Acrylonitrile | | | |
| 65/35 | 80/20 | Transparent. | Excellent | 1 |
|  | 75/25 | ----do------ | ----do------ | 2 |
|  | 70/30 | ----do------ | ----do------ | 3 |
|  | 65/35 | ----do------ | Fair | 4 |
|  | 60/40 | Translucent. | ----do------ | 5 |
|  | 55/45 | Opaque | Poor | 6 |
| 70/30 | 80/20 | Transparent. | Excellent | 7 |
|  | 75/25 | ----do------ | ----do------ | 8 |
|  | 70/30 | ----do------ | Good | 9 |
|  | 65/35 | Translucent. | Fair | 10 |
|  | 55/45 | Opaque | Poor | 11 |
| 75/25 | 80/20 | Transparent. | Excellent | 12 |
|  | 75/25 | ----do------ | ----do------ | 13 |
|  | 70/30 | ----do------ | ----do------ | 14 |
|  | 65/35 | Translucent. | Good | 15 |
|  | 60/40 | Opaque | Fair | 16 |
|  | 55/45 | ----do------ | Poor | 17 |
| 80/20 | 80/20 | Translucent. | Good | 18 |
|  | 70/30 | ----do------ | ----do------ | 19 |
|  | 65/35 | Opaque | Fair | 20 |
|  | 60/40 | ----do------ | ----do------ | 21 |
|  | 55/45 | ----do------ | Poor | 22 |

*Example II*

A. Preparation of substrate latex:

| | Pounds |
|---|---|
| Vinyl chloride | 1000 |
| Alkylated benzene sulfonate (as used in Example I) | 75 |
| Potassium persulfate | 0.204 |
| Disodium phosphate hydrate ($Na_2HPO_4 \cdot 12H_2O$) | 1.55 |
| Water (de-ionized) | 970 |

B. Grafted monomers:

| | |
|---|---|
| Vinyl chloride latex substrate (from ingredients at "A" immediately above) | 500 |
| Water (de-ionized) | 105 |
| t-Dodecyl mercaptan | .035 |
| Butadiene | 93.0 |
| Acrylonitrile | 40.0 |

A 300-gallon glass-lined autoclave provided with an anchor-type stirrer and with a heating and cooling jacket was provided for the preparation of the substrate latex. The ingredients listed at "A," with the exception of the vinyl chloride, were charged at 25° C., and the stirrer set in motion to dissolve the ingredients together. The free space in the reactor was then evacuated and purged with vinyl chloride vapor, and the vinyl chloride of the recipe pressured in. The temperature was then raised to 104° F. with agitation intensity, on the Pfaudler scale, of 1.5, the agitation being continued throughout the reaction to follow. The temperature was allowed to rise slowly, reaching 110° F. when the conversion had proceeded to an extent such that the total solids in the latex reached 49.5%. These conditions were maintained for a total of 24 hours, at the end of which time the unreacted vinyl chloride was vented, and the latex cooled to 25° C.

The latex prepared as just described, water and t-dodecyl mercaptan, in the amounts indicated in schedule "B," were then charged into a 200-gallon, glass-lined autoclave provided with an anchor-type agitator and with a heating and cooling jacket. The free space in the reactor was then evacuated and purged with butadiene vapor. The buadiene and acrylonitrile of the recipe were then charged, the temperature adjusted to 104° F., and agitation of intensity 2.5-3.0 on the Pfaudler scale commenced and continued throughout the reaction to follow. The temperature was allowed to raise gradually, reaching a maximum of 149° F. At the end of 24 hours, the excess monomers were vented, and the latex cooled to 25° C. for storage and use. The latex had excellent film-forming qualities, was admirably adapted for coating applications and had excellent mechanical stability, withstanding thirty minutes in a shaking apparatus without any flocculation. A single coat of this latex, applied to the bottom face of a regular production asphalt floor tile and dried at 50° C. for 1 hour, replaced two coatings (a seal coat and a barrier layer) heretofore required in this application. In order to evaluate the behavior of the films on aging, glass slides were dipped into the latex, and the adherent film dried at 50° C. for 1 hour and stripped off. Specimens of the film were aged in an oven at 100° C. for varying periods of time. The tensile strength and elongation of the aged specimens are tabulated herewith.

TABLE II

| Hours Exposure In Oven | 0 | 1 | 2 | 3 | 17 |
|---|---|---|---|---|---|
| Tensile Strength (pounds/sq. in.) | 366 | 868 | 1,070 | 1,178 | 2,000 |
| Elongation at Break (Percent) | 8 | 87 | 60 | 95 | 37 |

The latex contained 50% solids and had a pH of 6.9.

From the foregoing general description and detailed specific examples, it will be evident that this invention provides novel graft copolymers, and latices thereof, suitable for a wide variety of coating, impregnating and other applications. The manufacture is carried on with a minimum of skilled attendance, and makes use of the readily and cheaply available vinyl chloride, butadiene and acrylonitrile.

What is claimed is:

1. A graft copolymer of (I) a polymeric material selected from the group consisting of homopolymers of vinyl chloride and copolymers thereof with up to 20% of other ethylenically unsaturated compounds copolymerizable therewith, and (II) a mixture of (*a*) a diene selected from the group consisting of butadiene, isoprene, 2,3-dimethyl butadiene and piperylene, and (*b*) a nitrile selected from the group consisting of acrylonitrile, methacrylonitrile and alpha-ethyl acrylonitrile, the weight ratio of (I) the polymeric material to (II) the mixture being from 65/35 to 80/20, and the weight ratio of the diene to the nitrile in said mixture (II) being from 65/35 to 80/20.

2. A graft copolymer of (I) a homopolymer of vinyl chloride and (II) a mixture of butadiene and acrylonitrile, the weight ratio of (I) the homopolymer to (II) the mixture being from 65/35 to 80/20, and the weight ratio of the butadiene to acrylonitrile in said mixture (II) being from 65/35 to 80/20.

3. A hard, tough, adherent coating firmly adhered to a steel substrate, said coating comprising a graft copolymer of (I) a homopolymer of vinyl chloride and (II) a mixture of butadiene and acrylonitrile, the weight ratio of (I) the homopolymer to (II) the mixture being from 65/35 to 80/20, and the weight ratio of the butadiene to acrylonitrile in said mixture (II) being from 65/35 to 80/20.

4. A latex of a graft copolymer of (I) a polymeric material selected from the group consisting of homopolymers of vinyl chloride and copolymers thereof with up to 20% of other ethylenically unsaturated compounds copolymerizable therewith, and (II) a mixture of butadiene and acrylonitrile, the weight ratio of (I) the polymeric material to (II) the mixture being from 65/35 to 80/20, and the weight ratio of the butadiene to acrylonitrile in said mixture (II) being from 65/35 to 80/20.

5. A latex of a graft copolymer of (I) a homopolymer of vinyl chloride, and (II) a mixture of butadiene and acrylonitrile, the weight ratio of (I) the homopolymer to (II) the mixture being from 65/35 to 80/20, and the weight ratio of the butadiene to acrylonitrile in said mixture (II) being from 65/35 to 80/20.

6. Process which comprises polymerizing, by heating at 40° to 100° C., (I) a monomeric material selected from the group consisting of vinyl chloride and mixtures thereof with up to 20% of other ethylenically unsaturated monomers copolymerizable therewith, in emulsion in an aqueous medium containing a micelle-forming emulsifying agent containing hydrocarbon groups of 5–22 carbon atoms coupled to highly polar solubilizing groups, and a water-soluble free-radical polymerization catalyst to yield a latex of a polymerized monomeric material, adding, to the latex, (II) a mixture of butadiene and acrylonitrile and maintaining the temperature of the reaction mass at 40° to 100° C. to polymerize the resulting mixture, the weight ratio of the vinyl chloride polymer to the mixture of butadiene and acrylonitrile being from 65/35 to 80/20 and the weight ratio of butadiene to acrylonitrile in said mixture being from 65/35 to 80/20.

7. Process which comprises polymerizing, by heating at 40° to 100° C., (I) a monomeric material selected from the group consisting of vinyl chloride and mixtures thereof with up to 20% of other ethylenically unsaturated monomers compolymerizable therewith, in emulsion in an aqueous medium containing a micelle-forming emulsifying agent containing hydrocarbon groups of 5–22 carbon atoms coupled to highly polar solubilizing groups and a water-soluble free-radical polymerization catalyst to yield a latex of polymerized monomeric material, adding, to the latex, (II) a mixture of butadiene and acrylonitrile and maintaining the temperature of the reaction mass at 40° to 100° C. to polymerize the resulting mixture, the catalyst used in the polymerization of the monomeric material (I) being the sole polymerization catalyst used in the polymerization of said resulting mixture, the weight ratio of the polymer of the monomeric material to the mixture of butadiene and acrylonitrile being from 65/35 to 80/20, and the weight ratio of butadiene to acrylonitrile in said mixture being from 65/35 to 80/20.

References Cited in the file of this patent

UNITED STATES PATENTS

| | | |
|---|---|---|
| 2,512,697 | TeGrotenhuis | June 27, 1950 |
| 2,614,089 | Harrison et al. | Oct. 14, 1952 |
| 2,774,685 | Carnegie | Dec. 18, 1956 |
| 2,816,087 | Coover | Dec. 10, 1957 |
| 2,851,372 | Kaplan et al. | Sept. 9, 1958 |

OTHER REFERENCES

Whitby et al.: "Synthetic Rubber," page 630, Wiley, New York.